United States Patent
Moritomo

(10) Patent No.: US 11,509,174 B2
(45) Date of Patent: Nov. 22, 2022

(54) POWER RECEIVING APPARATUS, POWER TRANSMITTING APPARATUS, CONTROL METHODS THEREOF, AND NON-TRANSITORY COMPUTER-READABLE STORAGE MEDIUM

(71) Applicant: CANON KABUSHIKI KAISHA, Tokyo (JP)

(72) Inventor: Kazuo Moritomo, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/238,066

(22) Filed: Apr. 22, 2021

(65) Prior Publication Data

US 2021/0351629 A1  Nov. 11, 2021

(30) Foreign Application Priority Data

May 8, 2020 (JP) .............................. JP2020-082816

(51) Int. Cl.
  *H02J 50/80* (2016.01)
  *H02J 50/60* (2016.01)
  *H02J 50/10* (2016.01)

(52) U.S. Cl.
  CPC .............. *H02J 50/80* (2016.02); *H02J 50/10* (2016.02); *H02J 50/60* (2016.02)

(58) Field of Classification Search
  CPC .............. H02J 50/80; H02J 50/10; H02J 50/60
  See application file for complete search history.

(56) References Cited

U.S. PATENT DOCUMENTS

| 10,291,070 | B2* | 5/2019 | Eguchi ................ H04B 5/0037 |
| 11,289,954 | B2* | 3/2022 | Park ........................ H02J 50/80 |
| 2016/0087446 | A1* | 3/2016 | Zainaldin ................ H04L 12/10 307/104 |
| 2016/0301263 | A1* | 10/2016 | Schorpp ................. H02J 50/60 |
| 2016/0372963 | A1* | 12/2016 | Sankar .................... H02J 50/10 |
| 2017/0093214 | A1* | 3/2017 | Watanabe ............... H02J 50/10 |
| 2017/0229926 | A1* | 8/2017 | Oettinger ................ H02J 50/12 |
| 2018/0159356 | A1* | 6/2018 | Byun ................... H05K 999/99 |
| 2019/0334388 | A1* | 10/2019 | Van Wageningen .... H02J 7/025 |
| 2021/0075271 | A1* | 3/2021 | Van Wageningen .... H02J 50/12 |

(Continued)

FOREIGN PATENT DOCUMENTS

| JP | 2017-070074 A | 4/2017 | |
| KR | 1897646 B1 * | 9/2018 | ............. H02J 5/005 |
| WO | WO-2021180526 A1 * | 9/2021 | |

*Primary Examiner* — Pinping Sun
(74) *Attorney, Agent, or Firm* — Canon U.S.A., Inc. I.P. Division

(57) ABSTRACT

A power receiving apparatus comprises a power receiving unit that receives power transmitted wirelessly from a power transmitting apparatus, a communication unit that transmits, to the power transmitting apparatus, information regarding a received power received by the power receiving unit, and a control unit that determines whether or not it is necessary to update a reference value which is generated in the power transmitting apparatus on the basis of the information regarding the received power and is used for a detection of an object different from the power receiving apparatus by the power transmitting unit and requests the power transmitting apparatus to update the reference value when it is determined that it is necessary to update the reference value.

19 Claims, 9 Drawing Sheets

(56) References Cited

U.S. PATENT DOCUMENTS

2021/0184513 A1\* 6/2021 Park ................. H02J 50/80
2021/0257862 A1\* 8/2021 Muratov ............ H02J 50/60
2021/0384769 A1\* 12/2021 Staring ............. H02J 50/60

\* cited by examiner

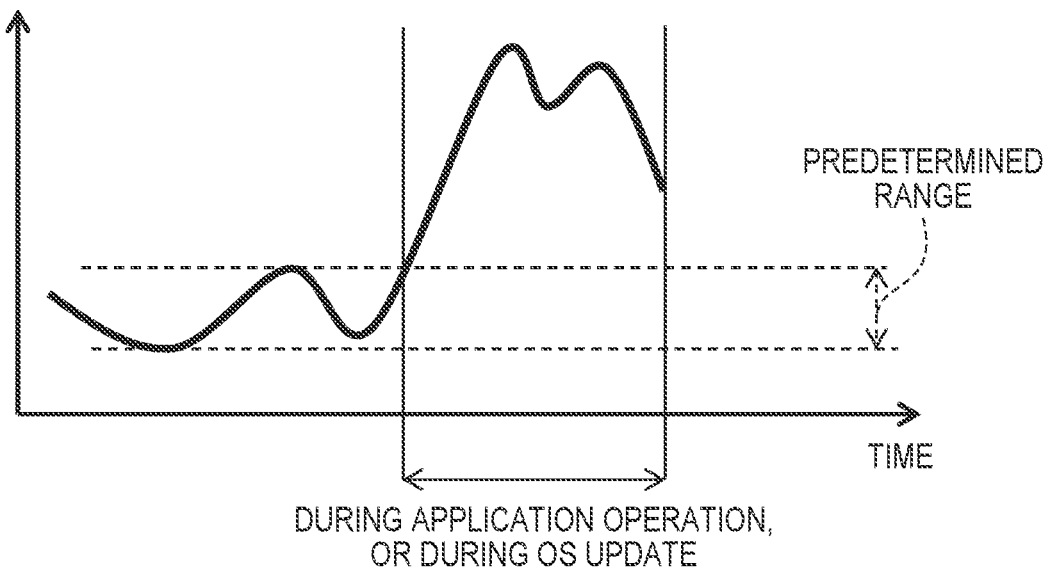
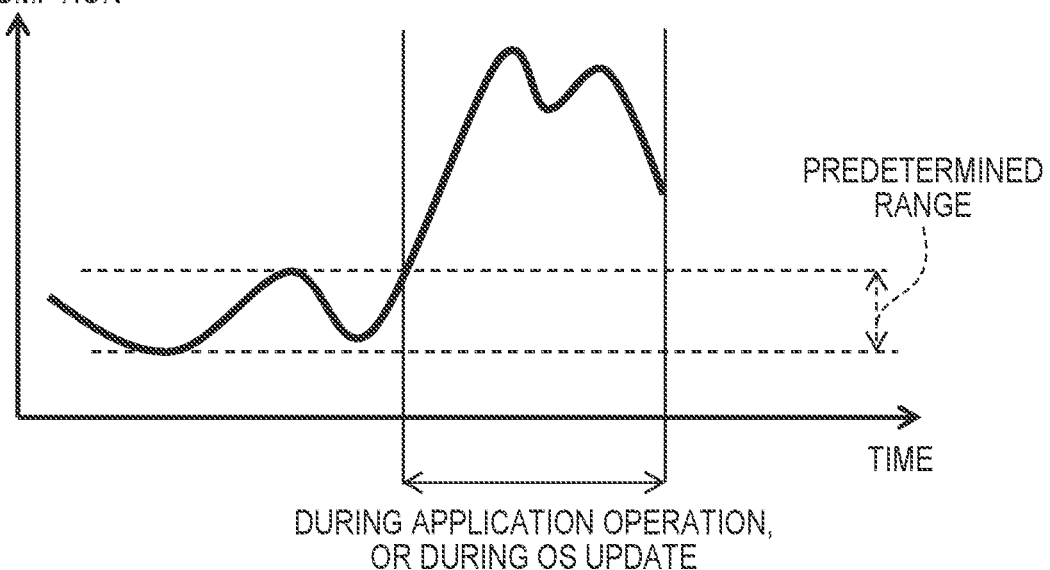

POWER RECEIVING APPARATUS, POWER TRANSMITTING APPARATUS, CONTROL METHODS THEREOF, AND NON-TRANSITORY COMPUTER-READABLE STORAGE MEDIUM

BACKGROUND

Field

The present disclosure relates to a power receiving apparatus, a power transmitting apparatus, and control methods and programs thereof, for wireless power transfer.

Description of the Related Art

The development of technology for wireless power transfer systems has become widespread in recent years. The Wireless Power Consortium (WPC), a standards organization, has developed standards for wireless charging (WPC standards). In wireless charging compliant with a WPC standard, a battery in a power receiving apparatus can be charged by placing the power receiving apparatus on a power transmitting apparatus, for example. However, if a conductive foreign object (such as a conductive metal piece) is present between the power transmitting apparatus and the power receiving apparatus, or in the vicinity of the power transmitting apparatus or the power receiving apparatus, the foreign object will generate heat and reduce the power transmission efficiency. It is therefore necessary to detect the presence of such foreign objects before the start of, or during, power transmission by the power transmitting apparatus.

According to Japanese Patent Laid-Open No. 2017-070074, a power transmitting apparatus calculates a difference between an actual power loss value and an estimated power loss value calculated in advance, and determines that a foreign object is present when the calculated difference is greater than or equal to a threshold value. Here, the "actual power loss value" is a difference between the value of power transmission output performed by the power transmitting apparatus and the value of power received from the power receiving apparatus. The "estimated power loss value" is calculated on the basis of the actual power loss value in the power received at two points, one from a light-load state and one from a load-connected state, communicated by the power receiving apparatus, by performing linear interpolation between those two points.

However, in smartphones and the like, the power consumption state fluctuates due to periodic system updates, application updates, and the like performed in the background, in addition to use by a user. Therefore, the power received by a smartphone operating as a power receiving apparatus, communicated to the power transmitting apparatus in the load-connected state, will depend on the timing of that communication. Furthermore, depending on the operating conditions of the smartphone, the smartphone itself will experience temperature changes. For example, as the power consumption increases, the temperature of the device itself also rises. This temperature rise has a significant impact on the properties of components, and changes the power received by the power receiving apparatus and the power loss estimated by the power transmitting apparatus.

If the power loss is estimated from the power losses measured in the light-load state and in the load-connected state at a certain point in time, the power transmitting apparatus will not be able to correctly estimate the power loss for the purpose of detecting a foreign object, depending on the operating conditions of the power receiving apparatus. As a result, there is a concern that the accuracy of detecting foreign objects by the power transmitting apparatus will be reduced. Although a method in which the power loss is estimated again after temporarily suspending the charging process is conceivable, doing so is not a sufficient solution to the stated problem, because if the temperature of the device drops due to the charging process being interrupted, it will no longer be possible to measure the power loss according to the operating conditions.

SUMMARY

One embodiment of the present disclosure provides a technique for suppressing a drop in the accuracy of power loss estimation caused by changes in the state of an apparatus.

According to one embodiment of the present disclosure, there is provided a power receiving apparatus including: a power receiving unit configured to receive power transmitted wirelessly from a power transmitting apparatus; a transmitting unit configured to transmit, to the power transmitting apparatus, information regarding a received power received by the power receiving unit; a determination unit configured to determine whether or not it is necessary to update a reference value, the reference value being generated in the power transmitting apparatus on the basis of the information regarding the received power and being used for a detection of an object different from the power receiving apparatus by the power transmitting apparatus; and a request unit configured to request the power transmitting apparatus to update the reference value when the determination unit determines it is necessary to update the reference value.

According to another embodiment of the present disclosure, there is provided a power transmitting apparatus that transfers power wirelessly to a power receiving apparatus, the power transmitting apparatus including: an obtainment unit configured to obtain a reference value which is obtained from a power transmission value and a received power value specified by received power information received from the power receiving apparatus and which is used for a detection of an object different from the power receiving apparatus; a storage unit configured to store the reference value; a receiving unit configured to receive an update request to update the reference value from the power receiving apparatus; and an update unit configured to, in response to the update request, update the reference value stored in the storage unit on the basis of the received power information received from the power receiving apparatus.

According to another embodiment of the present disclosure, there is provided a method of controlling a power receiving apparatus, the power receiving apparatus including a power receiving unit that receives power transmitted wirelessly from a power transmitting apparatus, and the method including: transmitting, to the power transmitting apparatus, information regarding a received power received by the power receiving unit; determining whether or not it is necessary to update a reference value, the reference value being generated in the power transmitting apparatus on the basis of the information regarding the received power and being used for a detection of an object different from the power receiving apparatus by the power transmitting apparatus; and requesting the power transmitting apparatus to update the reference value when it is determined in the determining that it is necessary to update the reference value.

According to another embodiment of the present disclosure, there is provided a method of controlling a power transmitting apparatus that transfers power wirelessly to a power receiving apparatus, the method including: obtaining a reference value which is obtained from a power transmission value and a received power value specified by received power information received from the power receiving apparatus and which is used for a detection of an object different from the power receiving apparatus; storing the reference value in a storage unit; receiving an update request to update the reference value from the power receiving apparatus; and in response to the update request, updating the reference value stored in the storage unit on the basis of the received power information received from the power receiving apparatus.

According to another embodiment of the present disclosure, there is provided a non-transitory computer-readable storage medium storing a program that causes a computer to execute a method of controlling a power receiving apparatus, the power receiving apparatus including a power receiving unit that receives power transmitted wirelessly from a power transmitting apparatus, and the method including: transmitting, to the power transmitting apparatus, information regarding a received power received by the power receiving unit; determining whether or not it is necessary to update a reference value, the reference value being generated in the power transmitting apparatus on the basis of the information regarding the received power and being used for a detection of an object different from the power receiving apparatus by the power transmitting apparatus; and requesting the power transmitting apparatus to update the reference value when it is determined in the determining that it is necessary to update the reference value.

According to another embodiment of the present disclosure, there is provided a non-transitory computer-readable storage medium storing a program that causes a computer to execute a method of controlling a power transmitting apparatus that transfers power wirelessly to a power receiving apparatus, the method including: obtaining a reference value which is obtained from a power transmission value and a received power value specified by received power information received from the power receiving apparatus and which is used for a detection of an object different from the power receiving apparatus; storing the reference value in a storage unit; receiving an update request to update the reference value from the power receiving apparatus; and in response to the update request, updating the reference value stored in the storage unit on the basis of the received power information received from the power receiving apparatus.

Further features of the present disclosure will become apparent from the following description of exemplary embodiments with reference to the attached drawings.

BRIEF DESCRIPTION OF THE DRAWINGS

FIG. 7A is a diagram illustrating an example of changes in the temperature of a smartphone over time.

FIG. 7B is a diagram illustrating an example of changes in the power consumption of a smartphone over time.

DESCRIPTION OF THE EMBODIMENTS

Embodiments will be described hereinafter in detail, with reference to the accompanying drawings. Note that the following embodiments are not intended to limit the disclosure. Although several features are described in the embodiments, all of these features are not necessarily required for the invention, and multiple features may be combined as desired. Furthermore, in the accompanying drawings, the same or similar configurations are given the same reference signs, and redundant descriptions thereof will be omitted.

First Embodiment

Figure 1:
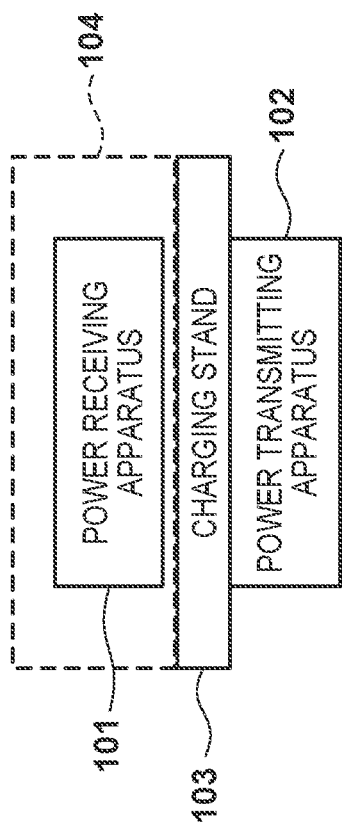
FIG. 1 is a diagram illustrating an example of the configuration of a wireless charging system according to an embodiment.

FIG. 1 illustrates an example of the configuration of a wireless charging system (a wireless power transfer system) according to a first embodiment. In one example, this system is configured including a power receiving apparatus 101 and a power transmitting apparatus 102. In the following, the power receiving apparatus 101 may be referred to as "RX", and the power transmitting apparatus 102 as "TX". RX is an electronic device that charges a built-in battery by receiving power transmitted wirelessly from TX. TX is an electronic device that transmits power wirelessly to RX placed on a charging stand 103. 104 indicates a range in which RX can receive power from TX. Note that RX and TX can have functions for executing applications aside from wireless charging. An example of RX is a smartphone, and an example of TX is an accessory device for charging the smartphone. RX and TX are not limited to these, however, and for example, RX and TX may be storage apparatuses such as hard disk apparatuses or memory apparatuses, or may be information processing apparatuses such as personal computers (PCs). RX and TX may be image input apparatuses such as image capturing apparatuses (cameras, video cameras, or the like) or scanners, or may be image output apparatuses such as printers, copiers, projectors, or the like. Furthermore, RX may be a vehicle, such as an automobile, for example, and TX may be a charger installed in the console or the like of the automobile, for example.

The wireless power transfer system according to the present embodiment transfers power wirelessly using an electromagnetic induction method for wireless charging, based on a WPC standard defined by the Wireless Power Consortium (WPC). In other words, RX and TX perform wireless power transfer for wireless charging based on the WPC standard between a power receiving coil in RX and a power transmission coil in TX. Note that the wireless power transfer method is not limited to a method defined by WPC standards, and may be another electromagnetic induction method, a magnetic resonance method, an electrical field resonance method, a microwave method, a method using lasers, or the like as well. In addition, although the present embodiment assumes that the wireless power transfer is used for wireless charging, the wireless power transfer may be used for applications other than wireless charging.

In the WPC standard, an amount of power that RX is guaranteed to receive from TX is defined by a value called Guaranteed Power (called "GP" hereinafter). The GP is a power value that is guaranteed to be output to a load of RX, such as a circuit for charging, even if the power transmission efficiency between the power receiving coil and the power transmission coil drops due to a change in the positional relationship between RX and TX, for example. For example, if the GP is 5 watts, TX will perform control and transmit power so that 5 watts can be output to the load in RX even if the positional relationship between the power receiving coil and the power transmission coil changes and the power transmission efficiency drops.

RX and TX according to the present embodiment perform communication for power transmission/reception control based on the WPC standard, and communication for device authentication. The communication for power transmission/reception control based on the WPC standard will be described first. The WPC standard defines a plurality of phases, including a Power Transfer phase in which power transfer is executed and a phase occurring before the actual power transfer takes place. Communication for the necessary power transmission control is performed in each phase.

The phases before power transfer include a Selection phase, a Ping phase, a Configuration phase, a Negotiation phase, and a Calibration phase. In the Selection phase, TX intermittently transmits an Analog Ping to detect the presence of an object within a power transmittable range (e.g., the power receiving apparatus 101, a conductive piece, or the like placed on the charging stand 103). In the Ping phase, TX recognizes that the detected object is RX by transmitting a Digital Ping and receiving a response from RX that has received the Digital Ping. In the Configuration phase, RX informs TX of identification information and ability information. In the Negotiation phase, the value of the GP is determined on the basis of the GP value requested by RX, the power transmission ability of TX, and the like. In the Calibration phase, RX informs TX of the received power value on the basis of the WPC standard, and TX makes adjustments for detecting foreign objects during power transmission. In the Power Transfer phase, in which power transfer is executed, control is performed for continuing power transmission, stopping power transmission in response to an error, a full charge, or the like, and so on.

TX and RX perform communication for this power transmission/reception control through in-band communication, in which signals are multiplexed using the same antennas (coils) as those used for the wireless power transfer on the basis of the WPC standard. Note that the range of the in-band communication based on the WPC standard between TX and RX is essentially the same as the power transmittable range. Accordingly, in FIG. 1, a range 104 indicates both the wireless power transfer ranges and the in-band communication ranges of the power transmission/receiving coils of TX and RX. Note that in the following descriptions, it is assumed that in-band communication is possible as long as RX has entered the range 104, even when RX has not been placed.

The configuration of the power receiving apparatus 101 (RX) according to the present embodiment will be described next. Note that the configuration described hereinafter is merely an example, and part (and in some cases, all) of the configuration described here may be replaced with other configurations that provide the same functions, or may be omitted entirely; furthermore, additional configurations may be added to the configurations described here. Furthermore, each single block described hereinafter may be divided into a plurality of blocks, and a plurality of blocks may be merged into a single block.

Figure 2:
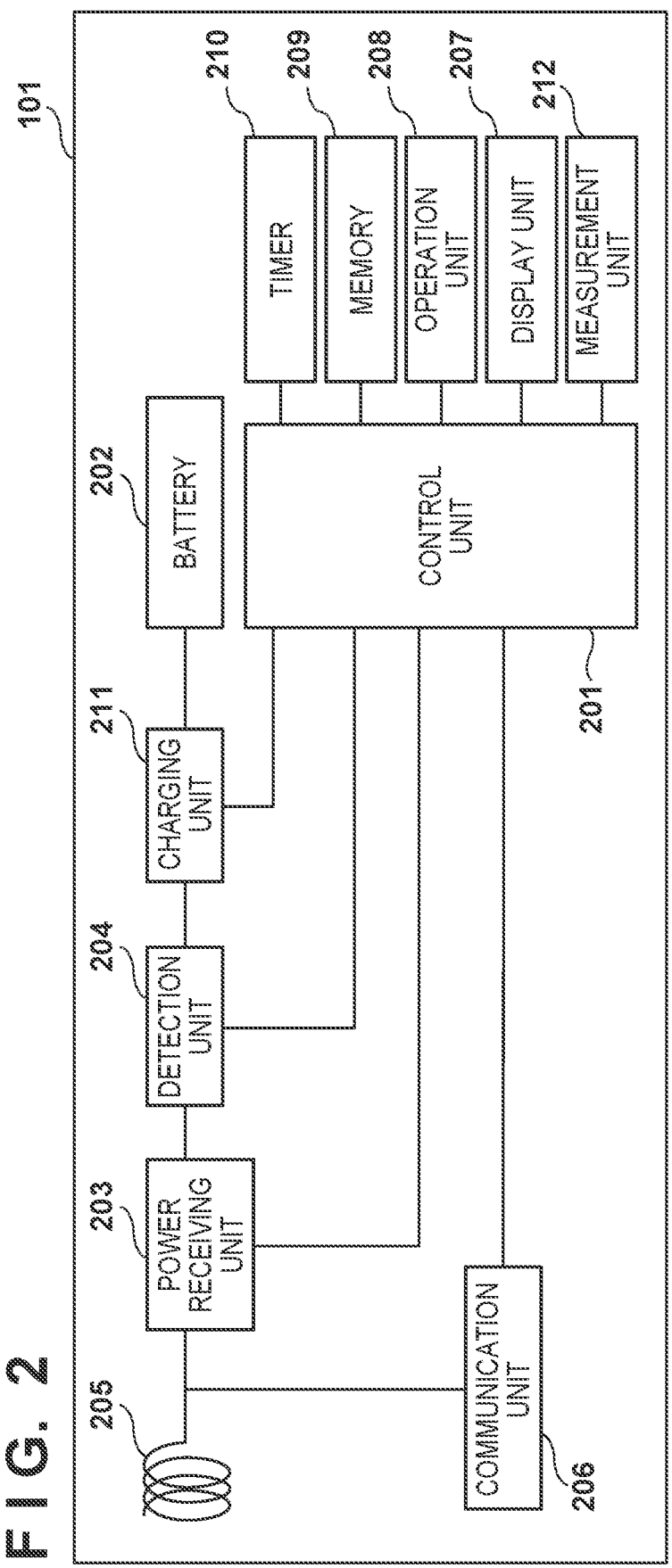
FIG. 2 is a block diagram illustrating an example of the configuration of a power receiving apparatus according to an embodiment.

FIG. 2 is a block diagram illustrating an example of the configuration of RX according to the first embodiment. A control unit 201 controls RX as a whole by executing a control program stored in memory 209, for example. In one example, the control unit 201 performs control required for device authentication and power reception in RX. The control unit 201 may perform control for executing applications aside from wireless power transfer. The control unit 201 is configured including at least one processor such as a Central Processing Unit (CPU), a Micro Processing Unit (MPU), or the like, for example. Note that the control unit 201 may be configured including dedicated hardware for specific processing, such as an Application-Specific Integrated Circuit (ASIC), an array circuit such as a Field Programmable Gate Array (FPGA) compiled to execute predetermined processing, and the like. The control unit 201 stores, in the memory 209, information which is to be stored during the execution of various types of processing. Additionally, the control unit 201 controls a communication unit 206 and a measurement unit 212 on the basis of a measurement result from the measurement unit 212, which will be described later.

A battery 202 supplies power necessary for control, power reception, and communication to RX as a whole. Additionally, the battery 202 stores power received via a power receiving coil 205. The power receiving coil 205 generates induced electromotive force in response to electromagnetic waves radiated from a power transmission coil 305 of TX. A power receiving unit 203 obtains AC power produced by electromagnetic induction in the power receiving coil 205. Then, the power receiving unit 203 transforms the AC power into DC or AC power having a predetermined frequency, and outputs the power to a charging unit 211 that performs processing for charging the battery 202. In other words, the power receiving unit 203 supplies power to a load in RX. The aforementioned GP is an amount of power guaranteed to be output from the power receiving unit 203.

A detection unit 204 detects whether or not RX is placed in the range 104 in which power can be received from TX, on the basis of the WPC standard. The detection unit 204 detects a voltage value or a current value in the power receiving coil 205 when the power receiving unit 203 has received the Digital Ping according to the WPC standard via the power receiving coil 205. The detection unit 204 can, for example, determine that RX is placed in the range 104 when the voltage is below a predetermined voltage threshold or when the current value exceeds a predetermined current threshold.

The communication unit 206 performs control communication based on the WPC standard as described above through in-band communication with TX. The communication unit 206 demodulates the electromagnetic waves input from the power receiving coil 205 and obtains information transmitted from TX. Furthermore, the communication with TX is performed by load-modulating the electromagnetic waves to multiplex the information to be transmitted to TX with the electromagnetic waves. In other words, the communication performed by the communication unit 206 is multiplexed with the power transmission from the power transmission coil 305 in TX (FIG. 3).

A display unit 207 presents information to a user through a desired method, such as visual, auditory, tactile, or the like. The display unit 207 informs the user, for example, of the state of RX, the state of the wireless power transfer system including TX and RX as illustrated in FIG. 1, and the like. The display unit 207 is configured including, for example, a liquid crystal display, LEDs, a speaker, a vibration generation circuit, and other notification devices. An operation unit 208 has an acceptance function for accepting operations of RX from the user. The operation unit 208 is configured including, for example, buttons, a keyboard, an audio input device such as a microphone, a motion detection device such as an accelerometer or a gyro sensor, and other input devices. A device in which the display unit 207 and the operation unit 208 are integrated, such as a touch panel, may be used as well.

The memory 209 stores various types of information as described above. The memory 209 may store information obtained by a functional unit different from the control unit 201. A timer 210 measures time, for example, using a count-up timer that measures the time elapsed from when the timer is activated, or a count-down timer that counts down from a set time. The measurement unit 212 periodically measures the apparatus temperature and power consumption of RX as a whole, and measures whether the measured values are within a predefined apparatus temperature range or power consumption range. If, as a result of the measurement, it is determined that the apparatus temperature or the power consumption is out of range, the control unit 201 is informed to that effect.

Figure 3:
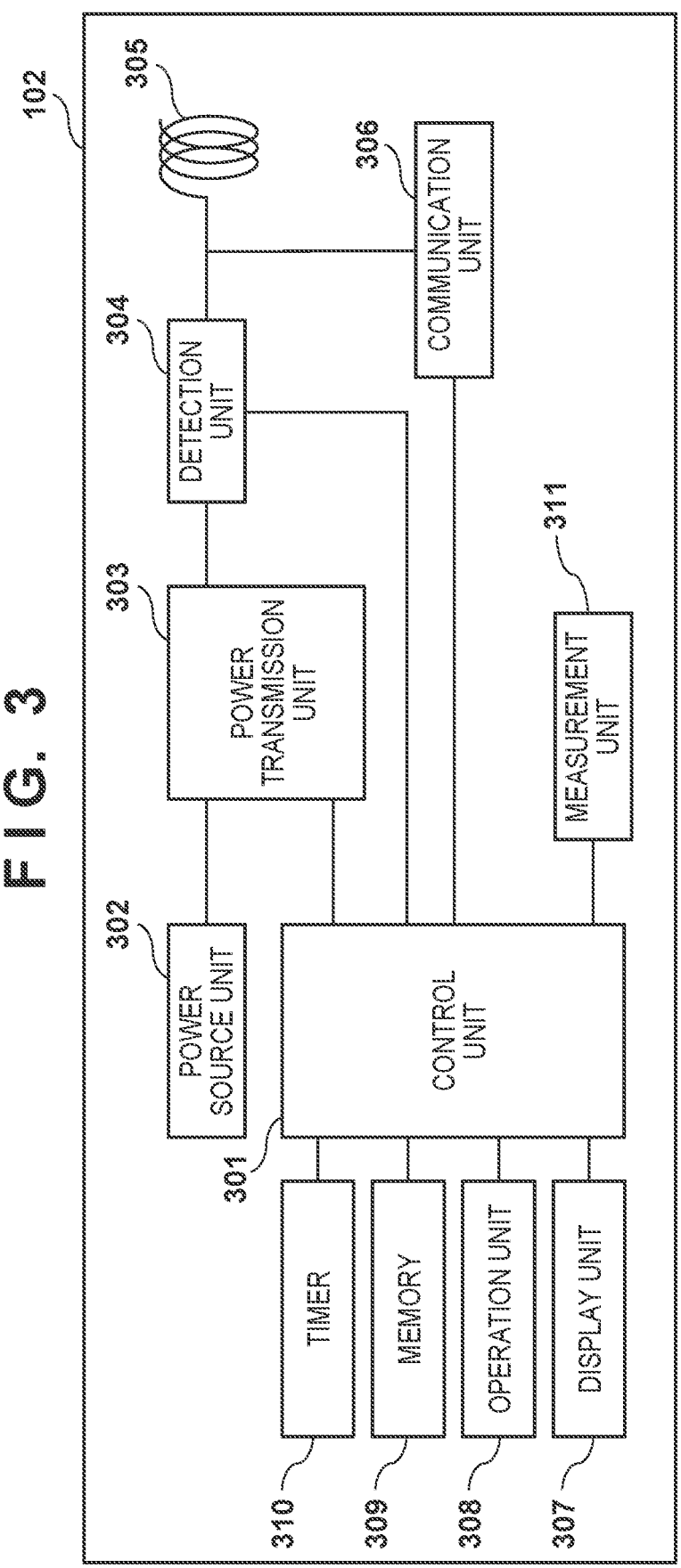
FIG. 3 is a block diagram illustrating an example of the configuration of a power transmitting apparatus according to an embodiment.

FIG. 3 is a diagram illustrating an example of the configuration of TX according to the present embodiment. A control unit 301 controls TX as a whole by executing a control program stored in memory 309, for example. In one example, the control unit 301 performs control required for device authentication and power transmission in TX. The control unit 301 may perform control for executing applications aside from wireless power transfer. The control unit 301 is configured including at least one processor such as a Central Processing Unit (CPU), a Micro Processing Unit (MPU), or the like, for example. Note that the control unit 301 may be configured including dedicated hardware for specific processing, such as an Application-Specific Integrated Circuit (ASIC), an array circuit such as a Field Programmable Gate Array (FPGA) compiled to execute predetermined processing, and the like. The control unit 301 stores, in the memory 309, information which is to be stored during the execution of various types of processing. The control unit 301 can also measure time using a timer 310.

A power source unit 302 supplies power necessary for control, power transmission, and communication to TX as a whole. The power source unit 302 is, for example, a commercial power supply or a battery. A power transmission unit 303 converts DC or AC power input from the power source unit 302 into AC-frequency power in the frequency band used for wireless power transfer. Furthermore, electromagnetic waves are generated for RX to receive power by inputting that AC-frequency power to the power transmission coil 305. Note that the frequency of the AC power generated by the power transmission unit 303 is approximately several hundred kHz (e.g., 110 kHz to 205 kHz). On the basis of an instruction from the control unit 301, the power transmission unit 303 inputs the AC-frequency power to the power transmission coil 305 so that the power transmission coil 305 outputs electromagnetic waves for power transmission to RX. Additionally, the power transmission unit 303 controls the strength of the electromagnetic waves to be output by adjusting the voltage (power transmission voltage) or current (power transmission current) input to the power transmission coil 305. When the power transmission voltage or the power transmission current is increased, the strength of the electromagnetic waves increases, whereas when the power transmission voltage or the power transmission current is reduced, the strength of the electromagnetic waves decreases. Additionally, on the basis of an instruction from the control unit 301, the power transmission unit 303 controls the output of the AC-frequency power so as to start or stop the power transmission from the power transmission coil 305.

A detection unit 304 detects whether an object is placed in the range 104 on the basis of the WPC standard. The detection unit 304 detects a voltage value or a current value in the power transmission coil 305 when the power transmission unit 303 has transmitted the Analog Ping according to the WPC standard via the power transmission coil 305. Then, when the voltage drops below a predetermined voltage value or the current value exceeds a predetermined current value, the detection unit 304 can determine that an object is present in the range 104. When a predetermined response to the Digital Ping that is subsequently transmitted by a communication unit 306 in in-band communication is received, the object is determined to be RX as opposed to another foreign object.

The communication unit 306 performs control communication based on the WPC standard as described above through in-band communication with RX. The communication unit 306 modulates the electromagnetic waves output from the power transmission coil 305 and transfers information to RX. Additionally, the communication unit 306 demodulates the electromagnetic waves output from the power transmission coil 305 and modulated in RX, and obtains the information transmitted by RX. In other words, the communication performed by the communication unit 306 is multiplexed with the power transmission from the power transmission coil 305.

A display unit 307 presents information to a user through a desired method, such as visual, auditory, tactile, or the like. The display unit 307 informs the user, for example, of the state of TX, information indicating the state of the wireless power transfer system including TX and RX as illustrated in FIG. 1, and the like. The display unit 307 is configured including, for example, a liquid crystal display, LEDs, a speaker, a vibration generation circuit, and other notification devices. An operation unit 308 has an acceptance function for accepting operations of TX from the user. The operation unit 308 is configured including, for example, buttons, a keyboard, an audio input device such as a microphone, a motion detection device such as an accelerometer or a gyrosensor, and other input devices. A device in which the display unit 307 and the operation unit 308 are integrated, such as a touch panel, may be used as well.

The memory 309 stores various types of information as described above. The memory 309 may store information obtained by a functional unit different from the control unit 301. The timer 310 measures time, for example, using a count-up timer that measures the time elapsed from when the timer is activated, or a count-down timer that counts down from a set time. A measurement unit 311 periodically measures the apparatus temperature of TX. Note that the measurement unit 311 is a configuration used by TX in the second embodiment and may be omitted in the first embodiment.

Figure 4:
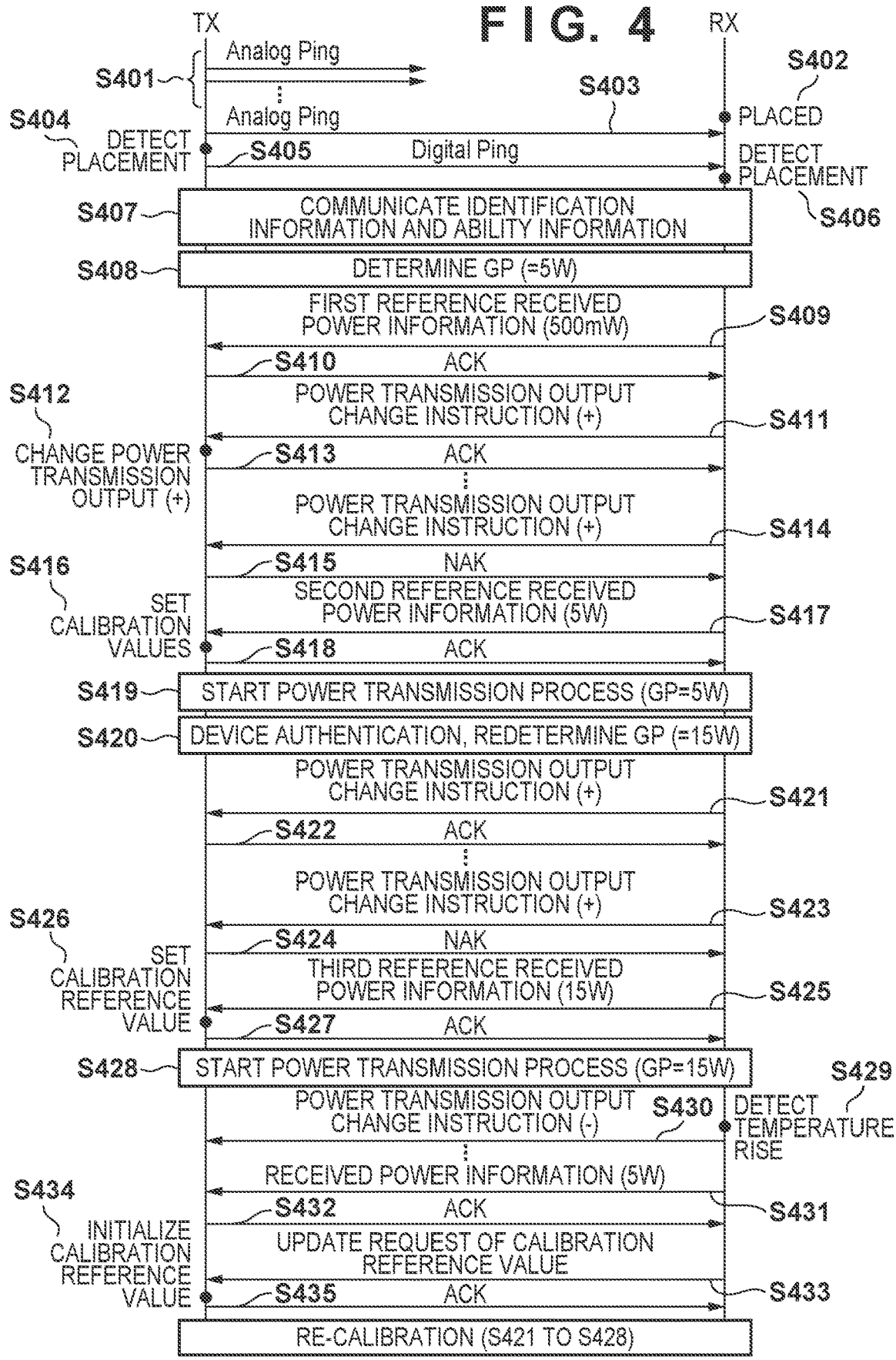
FIG. 4 is an operation sequence chart of a wireless charging system according to a first embodiment.
Figure 5:
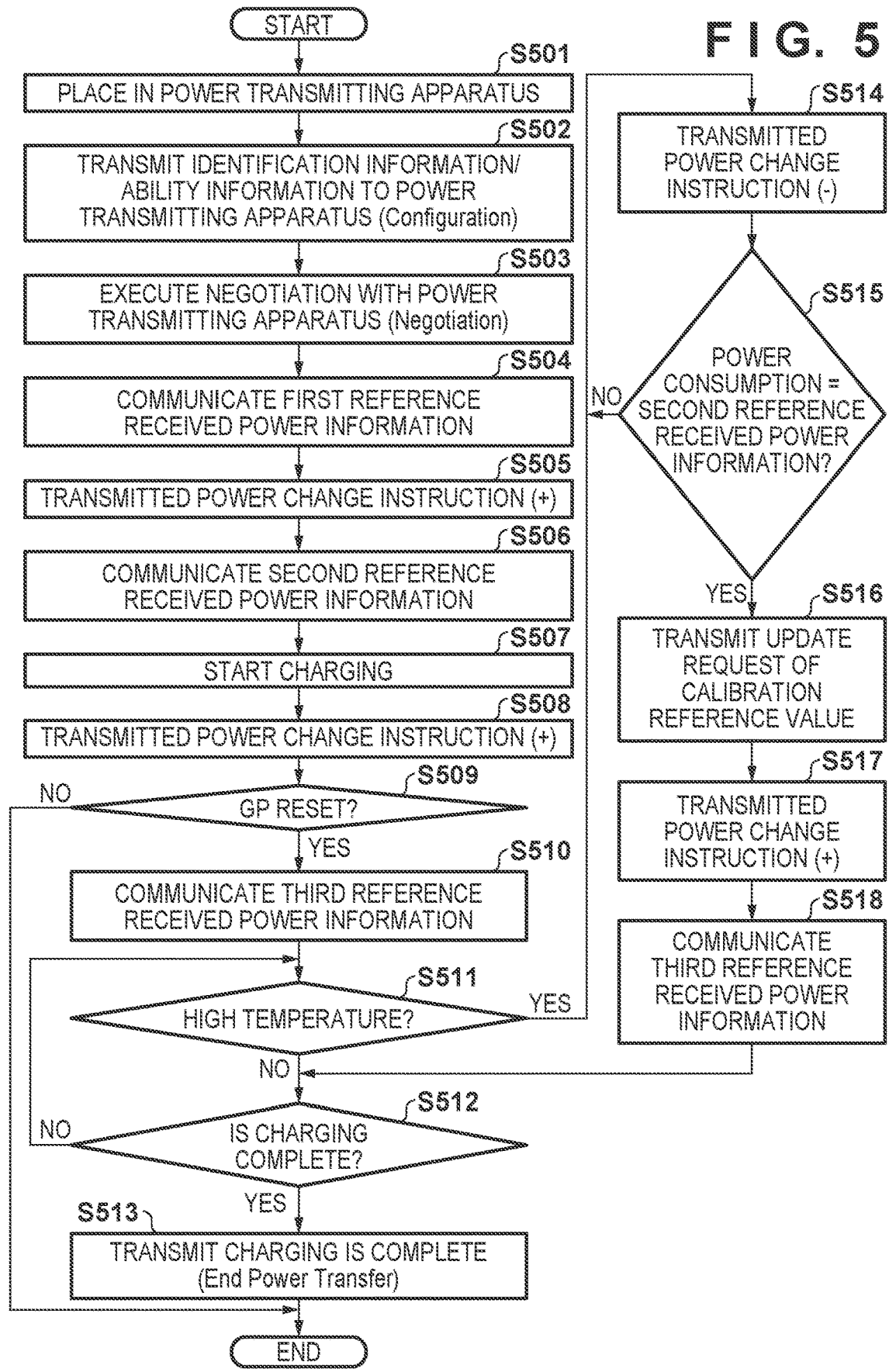
FIG. 5 is a flowchart illustrating operations performed by a power receiving apparatus according to the first embodiment.
Figure 6:
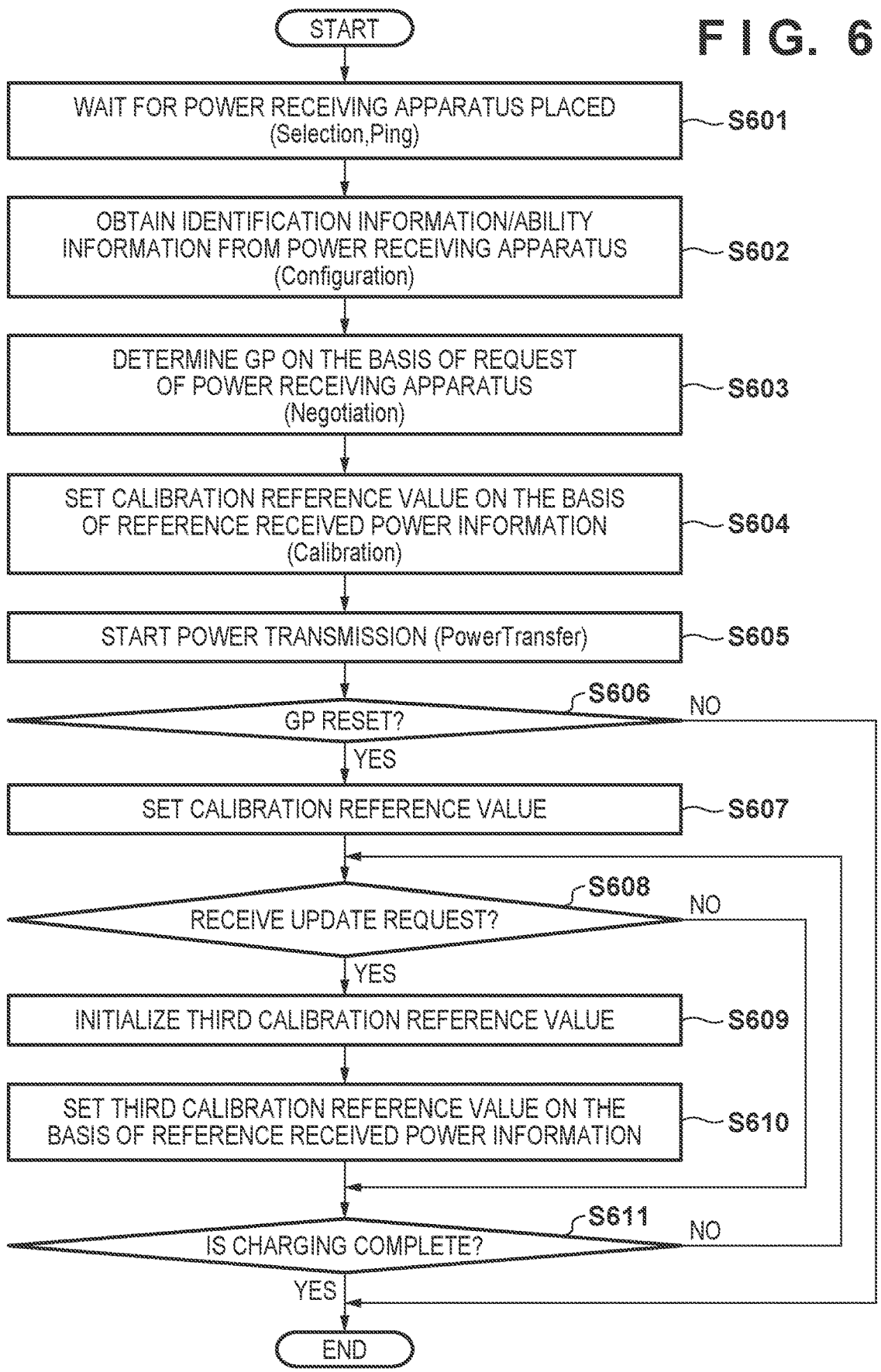
FIG. 6 is a flowchart illustrating operations performed by a power transmitting apparatus according to the first embodiment.

Next, operations of the power receiving apparatus 101 functioning as RX (e.g., a smartphone) and of the power transmitting apparatus 102 functioning as TX (e.g., an accessory device for charging) according to the first embodiment will be described with reference to the sequence chart in FIG. 4 and the flowcharts in FIGS. 5 and 6. FIG. 4 is a sequence chart illustrating wireless power transfer between RX and TX according to the first embodiment. FIG. 5 is a flowchart illustrating an example of operations performed by RX according to the first embodiment. FIG. 6 is a flowchart illustrating an example of operations performed by TX according to the first embodiment.

TX repeats the intermittent transmission of the Analog Ping according to the WPC standard to detect an object present within the power transmittable range (steps S401 and S601). The power transmitting apparatus 102 executes processing defined as the Selection phase and the Ping phase according to the WPC standard, and stands by for RX to be placed. A user of RX brings the power receiving apparatus 101 (the smartphone) closer to the power transmitting apparatus 102 in order to charge the device (steps S402 and S501). This can be thought of as RX being placed on the charging stand 103 of TX, specifically.

Upon detecting that an object is within the power transmittable range (steps S403 and S404), TX transmits the Digital Ping according to the WPC standard (steps S405 and S601). By receiving the Digital Ping, RX ascertains that TX has detected RX (step S406). Additionally, when a predetermined response to the Digital Ping has been received, TX determines that the detected object is RX and that RX has been placed on the charging stand 103.

Upon detecting that RX has been placed, TX obtains the identification information and the ability information from RX through communication in the Configuration phase defined by the WPC standard (steps S407, S502, and S602). Here, the identification information of RX includes a Manufacturer Code and a Basic Device ID. The ability information of RX includes the following: information elements that can specify the version of the supported WPC standard; a Maximum Power Value, which is a value that specifies the maximum power that RX can supply to the load; and information indicating whether or not RX has the Negotiation function according to the WPC standard. Note that TX may obtain the identification information and the ability information of RX through a method aside from the communication in the Configuration phase according to the WPC standard. Additionally, the identification information may be any other identification information capable of identifying the individual RX, such as a Wireless Power ID. Furthermore, information aside from that described above may be used as the ability information.

Next, TX determines the value of the GP with RX through communication in the Negotiation phase defined in the WPC standard (steps S408, S503, and S603). Note that step S408 is not limited to communication in the Negotiation phase according to the WPC standard, and a different method for determining the GP may be performed. Additionally, when TX has obtained (e.g., in step S407) information indicating that RX is not compliant with the Negotiation phase, the value of the GP may be set to a low value (e.g., a predefined value in the WPC standard) without performing the communication in the Negotiation phase. The GP is assumed to be 5 watts in the present embodiment.

After the GP has been determined, TX performs calibration processing on the basis of the GP (step S604). "Calibration" is processing in which TX calibrates a correlation between the value of power transmission output, which is a value measured in TX, and the value of the received power, which is a value measured in RX, for the power transmitted by TX to RX. In the calibration processing, TX sets a calibration reference value using the received power value from RX and a power transmission value corresponding to the received power value. Power loss, which is a difference between the power transmission value and the received power value, is estimated using the calibration reference value set through the calibration processing.

The calibration processing is executed as follows. First, RX transmits information including the received power value in a light-load state (called "first reference received power information" hereinafter) (steps S409 and S504). The first reference received power information is used by TX as a first calibration reference value. The first reference received power information in the present embodiment is information indicating a received power value corresponding to a transmitted power of 500 milliwatts. Although the first reference received power information is Received Power (model) defined by the WPC standard, another message may be used instead. TX determines whether or not to accept the first reference received power information from RX on the basis of TX's own power transmission state. When accepting, TX transmits an acceptance response (ACK) to RX, and when not accepting, TX transmits a rejection response (NAK) to RX.

Upon receiving the ACK from TX (step S410), RX performs processing for transmitting second reference received power information for TX to set a second calibration reference value. The second reference received power information is information including the received power value of RX when in a load-connected state. The GP is 5 watts in the present embodiment, and thus the second reference received power information is information indicating a received power value corresponding to a transmitted power of 5 watts. Here, although the second reference received power information is Received Power (mode2) defined by the WPC standard, another message may be used instead. RX transmits a power transmission output change instruction containing a positive value to increase the power transmission from TX to 5 watts (steps S411 and S505).

TX receives the power transmission output change instruction from RX, and when TX can handle the transmission power increase, TX returns an ACK and increases the transmitted power (steps S412 and S413). In the present embodiment, the second calibration reference value information indicates a transmitted power of 5 watts, and thus when TX has received a power increase request exceeding that wattage from RX (step S414), TX returns NAK in response to the power transmission output change instruction, which suppresses power transmission exceeding a specified value (step S415).

Upon determining that a default received power has been reached by receiving the NAK from TX, RX transmits the second reference received power information to TX (steps S417 and S506). The second reference received power indicates the received power value in the load-connected state. From this information, TX sets the first and second reference calibration values on the basis of the received power values included in the first and second reference received power information. When the first and second reference calibration values are set, an estimated value for the power loss in that segment can be calculated (steps S416 and S604). The calibration processing ends upon TX transmitting an ACK in response to the second reference received power information from RX (step S418). TX, which has determined that the charging process can be started, starts the process of transmitting power to RX at a GP of 5 watts (steps S419 and S605). RX receives the power transmitted from TX, and starts charging the battery 202 through the charging unit 211 (step S507).

TX and RX perform device authentication processing (steps S508 and S606), and if it is discovered that the respective devices can handle a higher GP, the GP can be reset to a higher value (YES in steps S420 and S508, and YES in step S606). Assume here yet the GP is reset to 15 watts. In this case, TX and RX perform the calibration processing again for a GP of 15 watts (steps S509, S510, and S607 (note that in step S607, the same processing as that performed in steps S603 to S605 is performed)).

Specifically, RX and TX use the power transmission output change instruction, ACK, and NAK to raise the power transmission output in order to bring the power transmission of TX up to 15 watts, as described above (steps S421 to S424 and S509). Upon receiving the NAK from TX in response to the power transmission output change instruction to increase the power transmission output (S424), RX transmits third reference received power information to TX (steps S425 and S510). The third reference received power information includes the received power value in a load-connected state for a GP of 15 watts. TX sets a third calibration reference value on the basis of the third reference received power information, and can calculate an estimated value of the power loss in that segment on the basis of the first, second, and third calibration reference values (step S426). The calibration processing is completed when TX transmits an ACK in response to the third reference received power information from RX (step S427). Having determined that the charging process can be started, TX starts the process of transmitting power to RX at a GP of 15 watts, and the charging of RX continues (step S428).

TX and RX finalize the power received, and the charging process for RX is implemented, through the foregoing processing. When the charging starts, RX determines whether or not it is necessary to update the calibration reference value used by TX to calculate the estimated value for the power loss (step S511). In the first embodiment, when the state of RX satisfies a predetermined condition, RX determines that it is necessary to update the calibration reference value used by TX. As illustrated in FIG. 7A, the temperature of a smartphone, which is a power receiving apparatus, fluctuates depending on usage conditions, and the power consumption depends on the fluctuating temperature. For example, the power consumption increases in response to application software ("applications" hereinafter) in the smartphone being executed, the smartphone's operating system ("OS" hereinafter) being updated, and so on. As a result, the device temperature of RX rises, and the temperature of TX, which is in contact with RX, rises as well. This temperature rise causes changes in the component properties of TX and RX, and affects the estimation of the power received by RX and the power loss of TX. Accordingly, in such circumstances, there is a concern that TX may not be able to correctly estimate power loss for detecting a foreign object. Based on this, it is desirable that when there is a change in the received power, RX sends third calibration reference value information appropriate for those circumstances to TX. Accordingly, in the present embodiment, when the temperature of RX deviates from a predetermined range such as that illustrated in FIG. 7A, it is determined that the calibration reference value in TX needs to be updated. The predetermined range may be determined by referring to the GP, the temperature properties of the apparatus, and so on.

When a rise in the temperature of RX is detected (YES in steps S429 and S511), a power transmission output change instruction is sent to TX to reduce the received power (steps S430 and S514). This is done to avoid the risk of heat being produced due to a foreign object on the charging stand 103 in circumstances where TX cannot correctly estimate the power loss. In the present embodiment, the power transmission output is reduced to 5 watts, which corresponds to the second calibration reference value (steps S431, S432, and S515). In other words, RX issues the power transmission output change instruction to TX to reduce the transmitted power until the received power value from TX reaches the received power value in the second reference received power information (5 watts, in the present example).

Additionally, when the received power drops to 5 watts, RX transmits an update request for the calibration reference value to TX in order to again perform the calibration processing reflecting the current received power circumstances (steps S433 and S516). Having received this update request, TX updates the third calibration reference value according to the received power from RX during a load-connected state. A method using the General Request Packet and Specific Request defined by Qi is conceivable as the method for communicating the update request, but the method is not limited thereto. The update request may be communicated using a newly-defined packet.

Upon receiving the update request for the calibration reference value (YES in step S608), TX initializes the third calibration reference value (steps S434 and S609) and returns an ACK to RX (step S435). RX and TX re-set the third calibration reference value by executing steps S421 to S427 described above. In other words, RX and TX use the power transmission output change instruction, ACK, and NAK to increase the transmitted power from TX to 15 watts (step S517). Upon determining that the transmitted power has reached 15 watts from a NAK response from TX made in response to the power transmission output change instruction, RX newly transmits the third reference received power information to TX (step S518).

Upon receiving the third reference received power information, TX transmits an ACK to RX (step S437), and re-sets the third calibration reference value. In this manner, TX can calculate an estimated value of the power loss in that segment on the basis of the first and second calibration reference values as well as the third calibration reference value under the current temperature state of the apparatus (step S610). Thereafter, RX periodically measures the apparatus temperature and continues the processing until the charging is complete (steps S512, S513, and S609).

As described thus far, when the device temperature changes in a power receiving apparatus such as a smartphone, updating the third calibration reference value set on the basis of received power in the load-connected state makes it possible to ensure the accuracy of foreign object detection by TX. Accordingly, when a conductive foreign object, such as a conductive metal piece, is placed between TX and RX, or in the vicinity thereof, the foreign object can be detected reliably.

Although the foregoing describes a case where a rise in the temperature of the power receiving apparatus is used as a trigger for updating the calibration reference value, the trigger is not limited thereto. For example, if the operations of the smartphone stabilize and the power consumption drops, the apparatus temperature will drop as well. To describe this in terms of FIG. 7A, there are situations where the temperature which was outside the predetermined range returns to the predetermined range. In such a case as well, updating the third calibration reference value through the foregoing procedure makes it possible to ensure the accuracy of foreign object detection by TX.

Additionally, although the foregoing describes determining whether or not to issue the update request for the calibration reference value on the basis of the temperature of the power receiving apparatus, the configuration is not limited thereto. For example, whether or not the update request is necessary may be determined on the basis of the power consumption of the smartphone serving as the power receiving apparatus. In this case, for example, it is determined that the third calibration reference value needs to be updated when the power consumption of the power receiving apparatus (the smartphone) is outside a predetermined range, as illustrated in FIG. 7B. It is conceivable to determine the predetermined range by referring to the GP, in the same manner as when using the temperature properties, for example. Furthermore, as will be described in a second embodiment, TX may determine whether or not the calibration reference value needs to be updated, and request that the update request be issued from TX to RX. In this case, upon receiving the issuance request from TX, RX makes a determination of YES in step S511, and starts the processing for communicating the update request (steps S514 to S518).

Furthermore, although an ACK is received in response to the calibration reference value update request sent by RX in FIG. 4, if ACK is not successfully received, the charging may be continued at 5 watts. This means that the calibration processing for a GP of 15 watts has not been performed yet, and therefore power transmission at the GP of 15 watts will be performed. Accordingly, a situation can be avoided where power transmission/charging processing is executed at a high power level in a state where the accuracy of the foreign object detection by TX is low. This can also be expected to suppress the occurrence of accidents occurring when a conductive foreign object, such as a conductive metal piece, is placed between TX and RX or in the vicinity thereof.

Second Embodiment

The first embodiment described a method in which RX determines whether or not it is necessary to update the calibration reference value and performs the calibration again. A second embodiment will describe a method in which TX determines whether or not it is necessary to update the calibration reference value and performs the calibration again. The system configuration in the second embodiment is the same as in the first embodiment (FIG. 1). Additionally, the measurement unit 311, which in the configuration described in the first embodiment (FIG. 3) periodically measures the apparatus temperature of TX, is used in the power transmitting apparatus 102 (TX) according to the second embodiment.

Figure 8:
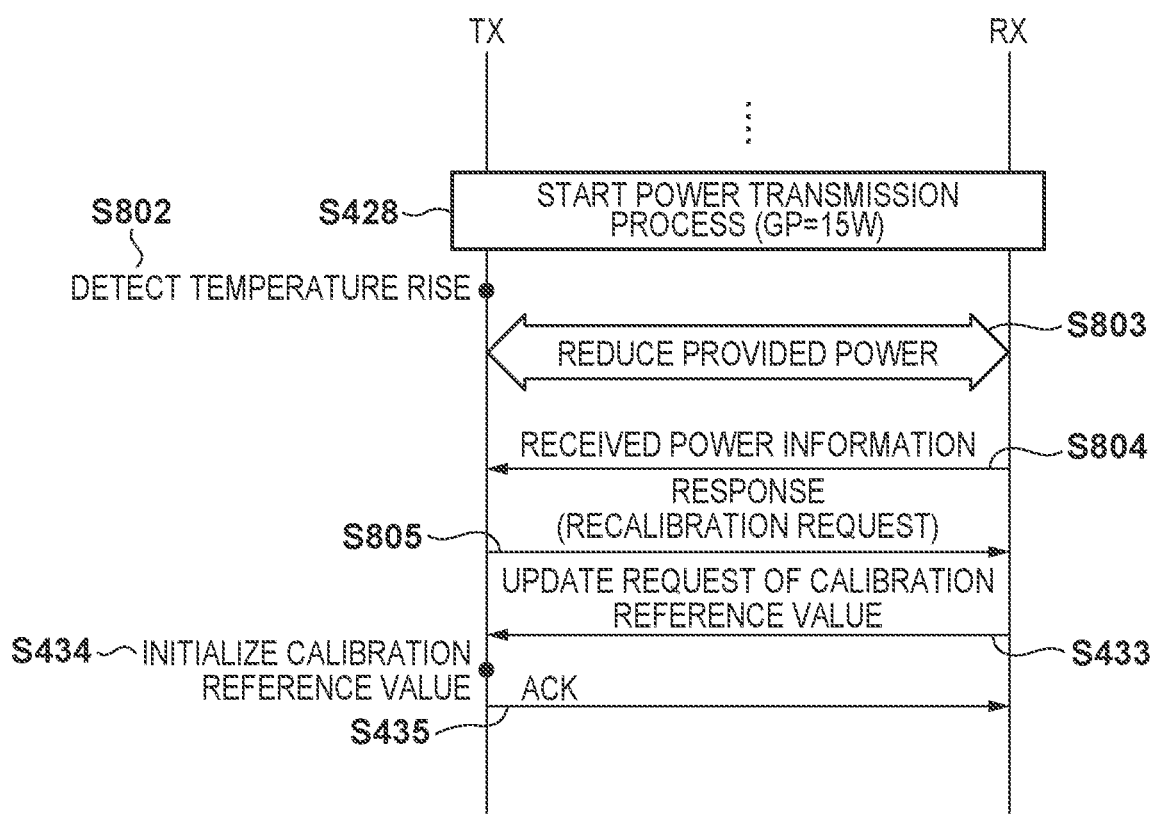
FIG. 8 is an operation sequence chart of a wireless charging system according to a second embodiment.
Figure 9:
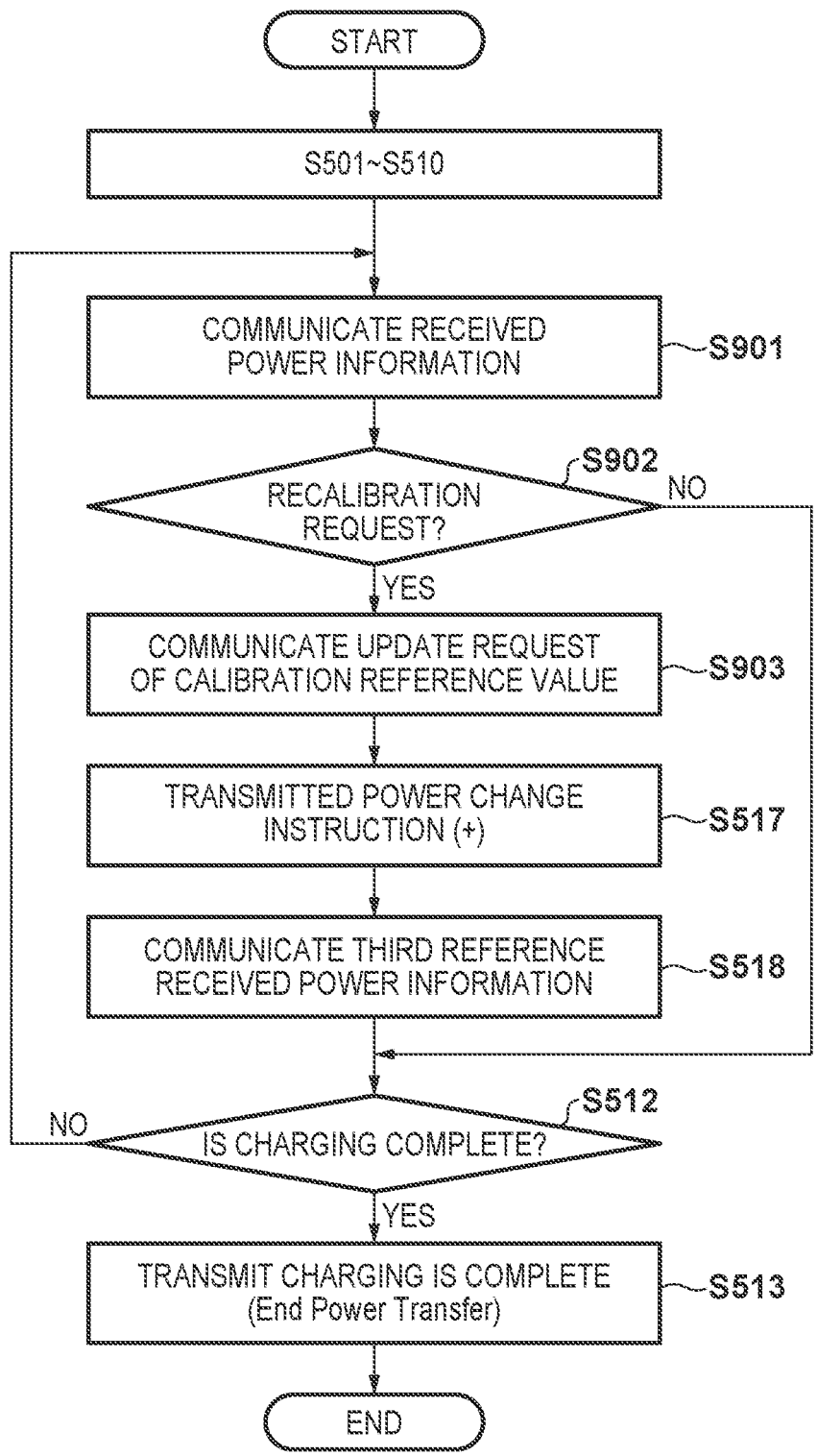
FIG. 9 is a flowchart illustrating operations performed by a power receiving apparatus according to the second embodiment.
Figure 10:
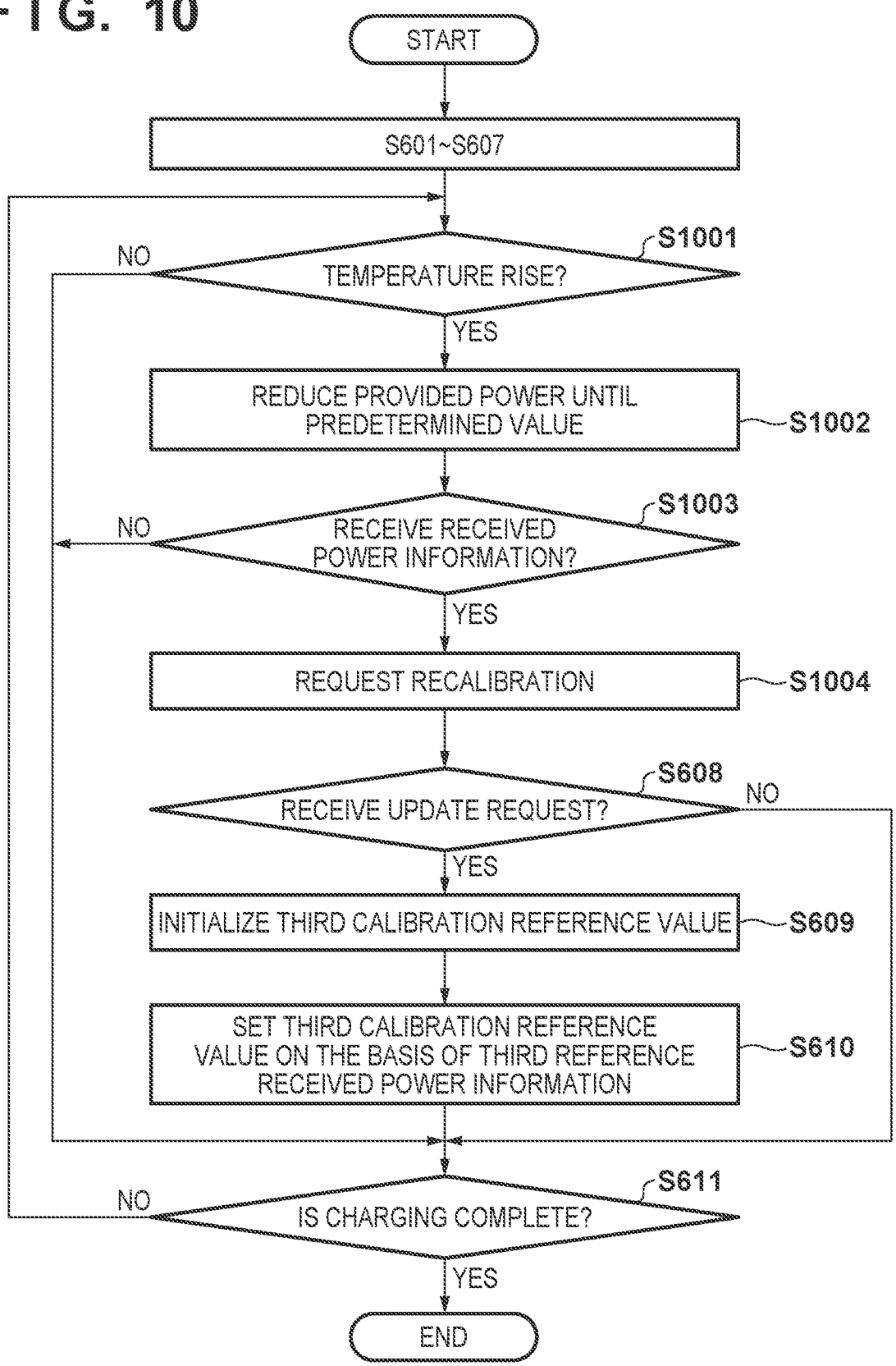
FIG. 10 is a flowchart illustrating operations performed by a power transmitting apparatus according to the second embodiment.

RX and TX according to the second embodiment perform communication for power transmission/reception control based on the same WPC standard as in the first embodiment, and communication for device authentication. FIG. 8 is a sequence chart illustrating wireless power transfer between RX and TX according to the second embodiment. FIG. 9 is a flowchart illustrating an example of operations performed by RX according to the second embodiment. FIG. 10 is a flowchart illustrating an example of operations performed by RX according to the second embodiment. Note that the processing from when RX is placed on the charging stand 103 of TX to when the first to third calibration reference values are set and power transmission is started through communication between TX and RX is the same as in the first embodiment (steps S401 to S428 in FIG. 4, steps S501 to S510 in FIG. 5, and steps S601 to S607 in FIG. 6). FIG. 8 illustrates the processing of the flow illustrated in FIG. 4, from the start of the power transmission process at a GP of 15 watts until the start of the re-setting of the calibration reference value (the process that replaces steps S428 to S435).

As described in the first embodiment, while RX is being charged by power transmission from TX (step S428), the device temperature rises in accordance with the usage conditions. As a result, the temperature of TX, which is in contact with RX, also rises. This temperature rise causes changes in the component properties of TX and RX, and affects the estimation of the power received by RX and the power loss of TX. Accordingly, in such circumstances, there is a concern that TX may not be able to correctly estimate power loss for detecting a foreign object. The following describes a method for responding to this issue by detecting the temperature rise on the TX side.

When TX detects a rise in the apparatus temperature periodically measured by the measurement unit 311 (e.g., the temperature of RX placed on the charging stand 103) (steps S802 and S1001), the provided power is reduced in response to a power supply request from RX (steps S803 and S1002). This is done to avoid the risk of heat being produced due to a foreign object on the charging stand 103 in circumstances where TX cannot correctly estimate the power loss. In the second embodiment, the second calibration reference value is reduced to the obtained power value (5 watts). As illustrated in FIG. 7A, TX determines the rise in temperature on the basis of whether or not the apparatus temperature is within a predetermined range. The predetermined range may be determined by referring to the GP.

On the other hand, RX periodically sends received power information, which indicates the received power value from TX, to TX (steps S804 and S901), and TX detects the power loss on the basis of this received power information and the calibration reference value. Upon receiving the received power information corresponding to the reduced provided power (YES in step S1003), TX transmits response to RX including information indicating that it is necessary to re-set the calibration reference value (steps S805 and S1004). The information indicating that it is necessary to re-set the calibration reference value may be, for example, information indicating that "re-calibration is necessary" or "the apparatus temperature of TX is rising". Note that this information is for issuing the update request for the calibration reference value to RX, and may be called an "issuance request" hereinafter. Having received a response including the issuance request (YES in step S902), RX transmits, to TX, an update request for updating the third calibration reference value by performing the calibration processing again (steps S433 and S903). The processing thereafter is the same as in the first embodiment. Having received the update request, TX updates the third calibration reference value through the same procedure as in the first embodiment (steps S608 to S610).

As described thus far, according to the second embodiment, when the device temperature of a power receiving apparatus (e.g., a smartphone) has changed, that temperature can be detected on the TX side. Accordingly, the same processing can be performed for the temperature change in RX as in the first embodiment, and when a conductive foreign object, such as a conductive metal piece, is placed between TX and RX, or in the vicinity thereof, the foreign object can be detected reliably.

Although the re-calibration and the updating of the calibration reference value on the basis of the temperature measured by the measurement unit 311 of TX are started in steps S802 and S1001, the configuration is not limited thereto. For example, when RX has determined that it is necessary to update the calibration reference value on the basis of the temperature measured by the measurement unit 212, TX may be informed to that effect, and TX may start the re-calibration and the updating of the calibration reference value using that informing as a trigger. Alternatively, information pertaining to the temperature may be received periodically from RX, and whether or not to start the re-calibration may be determined on the basis of the received temperature.

As described above, according to the foregoing embodiments, a drop in the accuracy of power loss estimation, caused by changes in the state of the apparatus, is suppressed.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-082816, filed May 8, 2020 which is hereby incorporated by reference herein in its entirety.

What is claimed is:

1. A power receiving apparatus comprising:
one or more processors; and
one or more memories which store instructions executable by the one or more processors to cause the power receiving apparatus to perform:
receiving power transmitted wirelessly from a power transmitting apparatus via a power receiving coil;
transmitting, to the power transmitting apparatus, information regarding the received power;
negotiating with the power transmitting apparatus to determine a guaranteed power;
determining, during wireless power transmission under the determined guaranteed power, whether or not it is necessary to update a reference value, the reference value being generated by the power transmitting apparatus based on the information regarding the received power obtained for the determined guaranteed power and being used for a detection of an object different from the power receiving apparatus by the power transmitting apparatus; and
requesting the power transmitting apparatus to update the reference value for the determined guaranteed power in a case where it is determined that it is necessary to update the reference value.

2. The apparatus according to claim 1,
wherein, in the determining whether or not it is necessary to update the reference value, it is determined to be necessary to update the reference value when a state of the power receiving apparatus satisfies a condition.

3. The apparatus according to claim 2,
wherein it is determined that the state of the power receiving apparatus satisfies the condition when a temperature measured for the power receiving apparatus is outside a range.

4. The apparatus according to claim 2,
wherein it is determined that the state of the power receiving apparatus satisfies the condition when a power consumption of the power receiving apparatus is outside a range.

5. The apparatus according to claim 1,
wherein, in the determining whether or not it is necessary to update the reference value, it is determined that it is necessary to update the reference value when the power transmitting apparatus has made a request to issue the request to update the reference value.

6. The apparatus according to claim 1, wherein the instructions executable by the one or more processors further causes the power receiving apparatus to perform:
making an instruction to the power transmitting apparatus to reduce a power transmission output based on the determination that it is necessary to update the reference value.

7. The apparatus according to claim 6,
wherein, in the requesting the power transmitting apparatus to update the reference value, it is requested that the power transmitting apparatus update the reference value after the received power from the power transmitting apparatus has dropped to a first value in response to the instruction.

8. The apparatus according to claim 1,
wherein, in the transmitting the information regarding the received power, the information regarding the received power is transmitted via the power receiving coil.

9. A power transmitting apparatus comprising:
one or more processors; and
one or more memories which store instructions executable by the one or more processors to cause the power transmitting apparatus to perform:

wirelessly transmitting power to a power receiving apparatus;

negotiating with the power receiving apparatus to determine a guaranteed power;

obtaining a reference value which is obtained from a power transmission value and a received power value specified by received power information received from the power receiving apparatus, the received power information received from the power receiving apparatus being obtained by the power receiving apparatus for the determined guaranteed power, and the reference value being used by the power transmitting apparatus for a detection of an object different from the power receiving apparatus;

storing the reference value;

receiving an update request, from the power receiving apparatus, to update the reference value for the determined guaranteed power; and in response to the update request, updating the stored reference value based on the received power information received from the power receiving apparatus, the received power information being obtained by the power receiving apparatus for the determined guaranteed power.

10. The power transmitting apparatus according to claim 9, wherein the power transmitting apparatus further comprising performs:

determining whether or not it is necessary to update the stored reference value; and requesting the power receiving apparatus to issue the update request when it is determined to be necessary to update the reference value.

11. The power transmitting apparatus according to claim 10, wherein it is determined to be necessary to update the reference value when a measured temperature is outside a range.

12. The power transmitting apparatus according to claim 10, wherein the power transmitting apparatus further performs:

causing a transmitted power to the power receiving apparatus to drop to a first value when it is determined to be necessary to update the reference value.

13. The power transmitting apparatus according to claim 12, wherein the transmitted power is caused to rise after causing the transmitted power to drop to the first value, and updating the reference value based on the power transmission value after the transmitted power has been caused to rise, and the received power information received from the power receiving apparatus.

14. The power transmitting apparatus according to claim 13, wherein after causing the transmitted power to drop to the first value, the transmitted power is caused to rise until the received power value indicated by the received power information reaches a second value.

15. The power transmitting apparatus according to claim 10, wherein a request to issue the update request is included in a signal responding to the received power information being received from the power receiving apparatus.

16. A method of controlling a power receiving apparatus, the method comprising:

receiving power transmitted wirelessly from a power transmitting apparatus via a power receiving coil;

transmitting, to the power transmitting apparatus, information regarding the received power;

negotiating with the power transmitting apparatus to determine a guaranteed power;

determining, during wireless power transmission under the determined guaranteed power, whether or not it is necessary to update a reference value, the reference value being generated by the power transmitting apparatus based on the information regarding the received power obtained for the determined guaranteed power and being used for a detection of an object different from the power receiving apparatus by the power transmitting apparatus; and requesting the power transmitting apparatus to update the reference value for the determined guaranteed power in a case where it is determined that it is necessary to update the reference value.

17. A method of controlling a power transmitting apparatus, the method comprising:

wirelessly transmitting power to a power receiving apparatus;

negotiating with the power receiving apparatus to determine a guaranteed power;

obtaining a reference value which is obtained from a power transmission value and a received power value specified by received power information received from the power receiving apparatus, the received power information received from the power receiving apparatus being obtained by the power receiving apparatus for the determined guaranteed power, and the reference value being used by the power transmitting apparatus for a detection of an object different from the power receiving apparatus;

storing the reference value;

receiving an update request, from the power receiving apparatus, to update the reference value for the determined guaranteed power; and in response to the update request, updating the stored reference value based on the received power information received from the power receiving apparatus, the received power information being obtained by the power receiving apparatus for the determined guaranteed power.

18. A non-transitory computer-readable storage medium storing a program that causes a computer to execute a method of controlling a power receiving apparatus, the method comprising:

receiving power transmitted wirelessly from a power transmitting apparatus via a power receiving coil;

transmitting, to the power transmitting apparatus, information regarding the received power;

negotiating with the power transmitting apparatus to determine a guaranteed power;

determining, during wireless power transmission under the determined guaranteed power, whether or not it is necessary to update a reference value, the reference value being generated by the power transmitting apparatus based on the information regarding the received power obtained for the determined guaranteed power and being used for a detection of an object different from the power receiving apparatus by the power transmitting apparatus; and requesting the power transmitting apparatus to update the reference value for the determined guaranteed power in a case where it is determined that it is necessary to update the reference value.

19. A non-transitory computer-readable storage medium storing a program that causes a computer to execute a method of controlling a power transmitting apparatus, the method comprising:
- wirelessly transmitting power to a power receiving apparatus;
- negotiating with the power receiving apparatus to determine a guaranteed power;
- obtaining a reference value which is obtained from a power transmission value and a received power value specified by received power information received from the power receiving apparatus,
  - the received power information received from the power receiving apparatus being obtained by the power receiving apparatus for the determined guaranteed power, and
  - the reference value being used by the power transmitting apparatus for a detection of an object different from the power receiving apparatus;
- storing the reference value;
- receiving an update request, from the power receiving apparatus, to update the reference value for the determined guaranteed power; and
- in response to the update request, updating the stored reference value based on the received power information received from the power receiving apparatus, the received power information being obtained by the power receiving apparatus for the determined guaranteed power.

* * * * *